US 8,977,954 B2

(12) United States Patent
Cho

(10) Patent No.: US 8,977,954 B2
(45) Date of Patent: Mar. 10, 2015

(54) METHOD AND SYSTEM FOR PROVIDING HTML-BASED APPLICATION CAPABLE OF CONTROLLING WEB ACTION AND CLIENT

(75) Inventor: Woo Sung Cho, Seoul (KR)

(73) Assignee: NHN Entertainment Corporation, Seongnam-si (KR)

( * ) Notice: Subject to any disclaimer, the term of this patent is extended or adjusted under 35 U.S.C. 154(b) by 571 days.

(21) Appl. No.: 12/696,885

(22) Filed: Jan. 29, 2010

(65) Prior Publication Data

US 2010/0205548 A1    Aug. 12, 2010

(30) Foreign Application Priority Data

Feb. 6, 2009  (KR) .................. 10-2009-0009906

(51) Int. Cl.
  *G06F 9/44*    (2006.01)
(52) U.S. Cl.
  CPC .................................. *G06F 9/4443* (2013.01)
  USPC ........................................ 715/234; 715/760
(58) Field of Classification Search
  CPC . G06F 3/0484; G06F 3/1246; G06F 17/2247; G06F 21/554
  USPC .................................................. 715/234, 760
  See application file for complete search history.

(56) References Cited

U.S. PATENT DOCUMENTS

| | | | |
|---|---|---|---|
| 6,240,444 B1 | 5/2001 | Fin et al. | |
| 6,340,977 B1* | 1/2002 | Lui et al. ....................... | 715/709 |
| 6,363,359 B1* | 3/2002 | Gronemeyer et al. .......... | 705/28 |
| 6,446,046 B1* | 9/2002 | Gronemeyer et al. .......... | 705/28 |
| 6,662,341 B1* | 12/2003 | Cooper et al. ................. | 715/234 |
| 6,664,897 B2* | 12/2003 | Pape et al. .................... | 340/573.3 |
| 6,714,928 B1* | 3/2004 | Calow ............................ | 1/1 |
| 6,952,799 B2* | 10/2005 | Edwards et al. ............... | 715/207 |
| 7,284,192 B2* | 10/2007 | Kashi et al. .................... | 715/232 |
| 7,890,570 B2* | 2/2011 | Mazzaferri .................... | 709/202 |
| 7,930,744 B2* | 4/2011 | Teller et al. .................... | 726/22 |
| 2002/0051017 A1* | 5/2002 | Wishoff ......................... | 345/774 |
| 2002/0054086 A1* | 5/2002 | Van Oostenbrugge et al. ............................. | 345/744 |
| 2002/0112048 A1* | 8/2002 | Gruyer et al. ................. | 709/224 |
| 2005/0010567 A1* | 1/2005 | Barth et al. ..................... | 707/3 |
| 2008/0098026 A1* | 4/2008 | Kraft et al. .................... | 707/102 |

FOREIGN PATENT DOCUMENTS

| | | |
|---|---|---|
| CN | 1921484 | 2/2007 |
| CN | 101034397 | 9/2007 |

(Continued)

OTHER PUBLICATIONS

COM, OLE and ActiveX Hooking; Oct. 11, 2008; jacquelin.potier. free.fr; pp. 1-6.*

(Continued)

*Primary Examiner* — Andrew Dyer
(74) *Attorney, Agent, or Firm* — H. C. Park & Associates, PLC

(57) ABSTRACT

The present disclosure relates to a method and system for providing an HTML-based application capable of controlling web actions and clients. The system includes an HTML skin-generating module to generate an HTML skin that includes instructions corresponding to business logic, and a script to control a skin according to the business logic. The system also includes an application drive file-generating module to generate an application drive file to interoperate with the HTML skin to execute the business logic.

19 Claims, 6 Drawing Sheets

(56) References Cited

FOREIGN PATENT DOCUMENTS

| | | |
|---|---|---|
| JP | 10-124461 | 5/1998 |
| JP | 2004-318607 | 11/2004 |
| JP | 2006-276939 | 10/2006 |
| KR | 10-2006-0006224 | 1/2006 |

OTHER PUBLICATIONS

George Mihaescu; Proper Web User Control client-side event hooking through JavaScript; Mar. 20, 2007; Abstraction Software, Inc.; pp. 1-6.*

X/HTML 5 Versus XHTML 2; Feb. 21, 2007; XHTML.com; pp. 1-6.*

* cited by examiner

METHOD AND SYSTEM FOR PROVIDING HTML-BASED APPLICATION CAPABLE OF CONTROLLING WEB ACTION AND CLIENT

CROSS REFERENCE TO RELATED APPLICATION

This application claims priority from and the benefit of Korean Patent Application No. 10-2009-0009906, filed on Feb. 6, 2009, which is hereby incorporated by reference for all purposes as if fully set forth herein.

BACKGROUND OF THE INVENTION

1. Field of the Invention

Exemplary embodiments of the present invention relate to a method and system for providing a HyperText Markup Language (HTML)-based application and, more particularly, to a method and system for providing an HTML-based application capable of controlling web actions and clients.

2. Discussion of the Background

FIG. 1 shows an example of a conventional application that uses an image file as a skin file.

Referring to FIG. 1, the conventional application 10 may use an image file 11, such as, for example, BMP or JPG, as a skin file. As such, when an image file is used as a skin file to cover a portion or the whole of the conventional application 10, the skin file may provide only a simple function of showing an image. Thus, change of a fundamental frame of the skin file may be limited because the application may have predetermined arrangements of controls and functions. Further, the skin file may be required to be previously distributed to the respective user terminals where the application will be executed.

To solve such problems, a technique has been developed that creates an HTML region by installing a web control on a region of an application.

FIG. 2 shows an example of a conventional application that uses an HTML page as a skin file.

Referring to FIG. 2, a conventional application 20 includes an application region 21 and an HTML region 22.

The application region 21 displays user interfaces, such as an update section 21a, a game execute button 21b, and the like, which are related to business logic of the application.

The HTML region 22 may display an HTML page hyperlinked to a specific web page of the application region 21, image files, advertisements, announcements, and the like.

However, although the HTML page can be loaded in some regions of the conventional application and linked to various application pages to display the application pages in addition to image files, the HTML page may be operated independent of business logic is processed by the application. Thus, the HTML page cannot control clients and provides a simple function of displaying content hyperlinked thereto.

Moreover, since the conventional application secures the HTML region to a predetermined section in the application region, it may be difficult to change the size, design and utility of the HTML region.

SUMMARY OF THE INVENTION

Exemplary embodiments of the present invention provide a method and system for providing an HTML-based application capable of controlling web actions and clients.

Exemplary embodiments of the present invention also provide an HTML-based application capable of simultaneously controlling a web action and a client through interoperation between an HTML region and an application region.

Exemplary embodiments of the present invention also provide an HTML-based application capable of easily modifying a user interface (UI) of the application merely by modifying HTML information used as a skin file.

Additional features of the invention will be set forth in the description which follows, and in part will be apparent from the description, or may be learned by practice of the invention.

An exemplary embodiment of the present invention discloses a system for providing a HyperText Markup Language (HTML)-based application capable of controlling web actions and clients, the system including an HTML skin-generating module to generate an HTML skin, the HTML skin including instructions corresponding to business logic, and including a script to control the HTML skin according to the business logic, and an application is drive file-generating module to generate an application drive file, the application drive file being configured to hook event information generated by the HTML-based application and to execute corresponding business logic.

An exemplary embodiment of the present invention also discloses A method of providing a HyperText Markup Language (HTML)-based application capable of controlling web actions and clients, the method including generating an application drive file configured to hook event information generated by the HTML-based application, and to execute corresponding business logic, generating and storing an HTML skin configured to interoperate with the application drive file, and providing the HTML skin to a client, wherein the HTML skin includes instructions corresponding to the business logic.

An exemplary embodiment of the present invention also discloses A method of interoperating a HyperText Markup Language (HTML) region with an application region in an HTML-based application capable of controlling web actions and clients, the method including hooking event information generated in the HTML region, determining whether the event information is an instruction corresponding to a web action or to business logic, executing, in the application region, the business logic corresponding to the instruction, in response to a determination that the hooked event information is an instruction corresponding to business logic, and displaying a result of executing the business logic in the HTML region in response to business logic being executed in the application region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
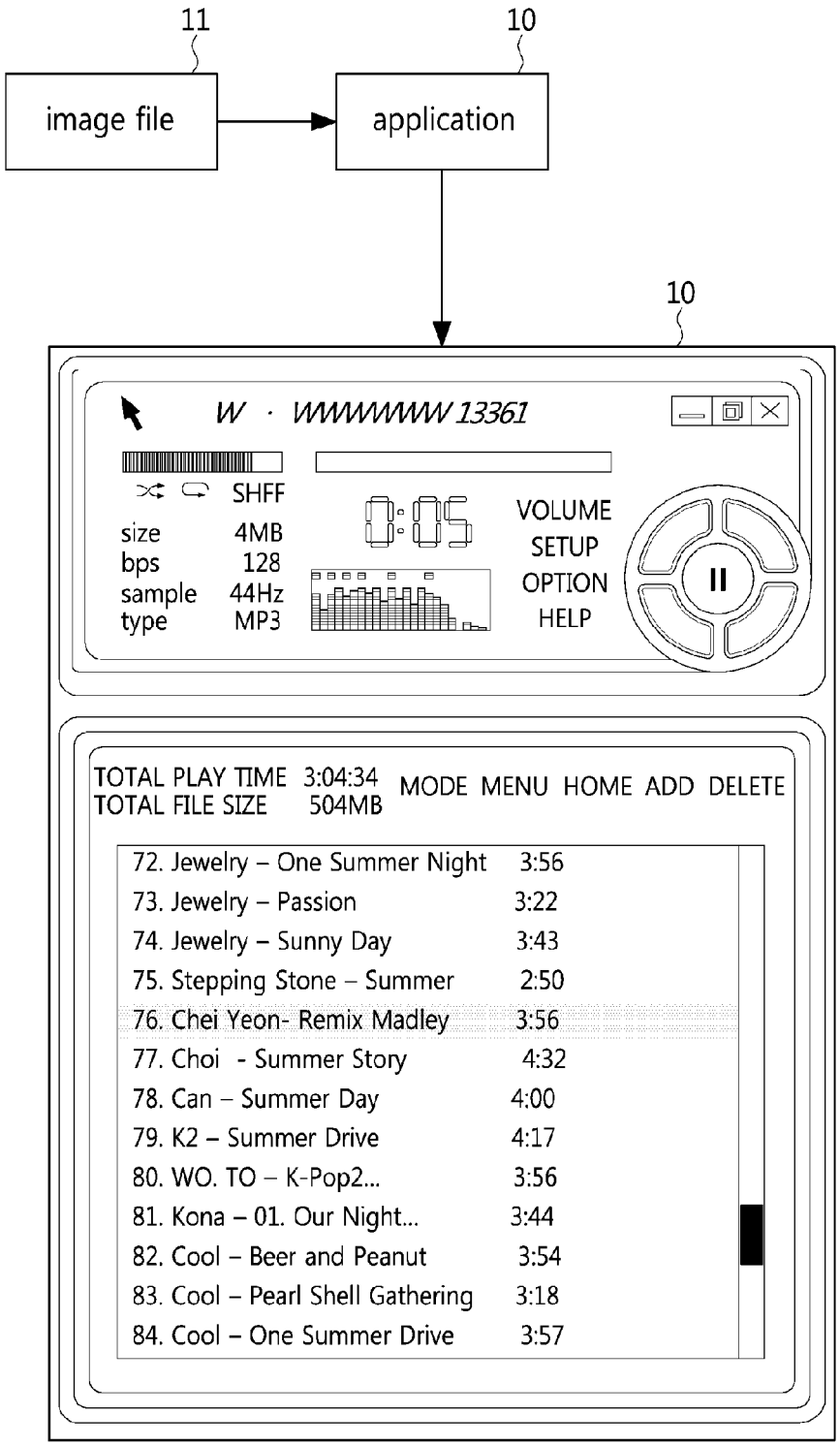
FIG. 1 shows an example of a conventional application that uses an image file as a skin file.
Figure 2:
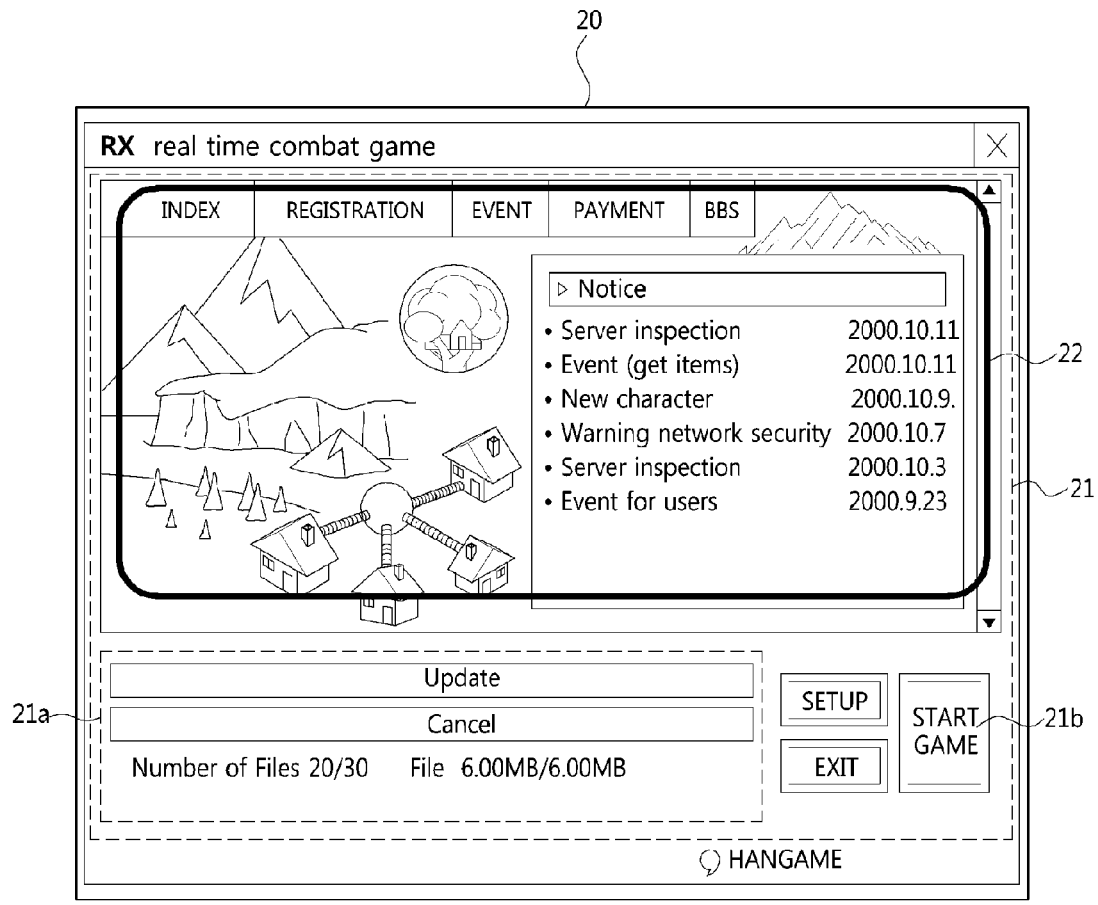
FIG. 2 shows an example of a conventional application that uses an HTML page as a skin file.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Furthermore, it should be understood that the embodiments of the present disclosure are different from each other but are not exclusive with respect to each other, and illustration of details not directly related to the detailed description of the present disclosure may be omitted in the drawings for clarity.

In the following description and claims, the term "connected" may be used to indicate not only that two or more elements are "directly or physically connected" to each other, but also that two or more elements are "electrically connected" to each other with a third element interposed therebetween. Further, the articles "a", "an", and "the" may be used to mean that there are one or more components, and the terms "includes", "has" "with" or "comprises" may be used not to exclude other components but to further include other components, unless otherwise indicated.

Further, the term "application" may refer to an application program that is composed of HyperText Markup Language (HTML) and is capable of simultaneously controlling web actions and clients.

Further, the term "HTML skin" may refer to a skin file that is composed of JAVASCRIPT® capable of being called using an operating system (OS) component (for example, Component Object Model (COM)), to interoperate with the application and may include user interfaces (UIs) composed of JAVASCRIPT® capable of being called by COM.

Further, the term "application drive file" may refer to a drive file of an application that can be provided to a client, and that executes business logic by hooking event information of the application using an OS component (for example, COM).

Further, the term "hooking" or "hooked" may refer to a technique that obtains specific event information generated from the application using an OS component (for example, COM).

Referring to FIG. 3, FIG. 4, FIG. 5a, FIG. 5b, FIG. 6, FIG. 7, and FIG. 8, a method and system for providing an HTML-based application capable of controlling web actions and clients in accordance with an exemplary embodiment will be described.

Figure 3:
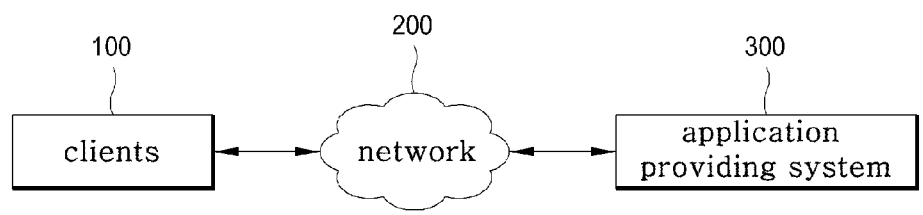
FIG. 3 shows a connection relationship between clients and a system for providing an HTML-based application capable of controlling web actions and clients in accordance with an exemplary embodiment of the present invention.

FIG. 3 shows a connection relationship between clients 100 and the HTML-based application providing system 300 in accordance with an exemplary embodiment of the present invention.

Referring to FIG. 3, a network connection of the HTML-based application providing system 300 according to an exemplary embodiment includes clients 100, a network 200 and the HTML-based application providing system 300.

The clients 100 are user terminals that are connected to the HTML-based is application providing system 300 through the network 200 to receive the application capable of controlling web actions and clients. The clients may be, for example, computers, mobile phones, and the like.

Examples of a computer include a notebook computer, a desktop computer, a laptop, and the like. Examples of a mobile phone include any kind of handheld wireless communication device, such as a personal communication system (PCS), global system for mobile communication (GSM), personal digital cellular (PDC), personal handy-phone system (PHS), personal digital assistant (PDA), international mobile telecommunication-2000 (IMT-2000) terminal, code division multiple access-2000 (CDMA-2000) terminal, W-CDMA terminal, wireless broadband internet (WiBro) terminal, and the like.

The network 200 may be any kind of wired communication network such as a local area network (LAN), wide area network (WAN), value added network (VAN), and the like, or any kind of wireless communication network such as a mobile radio communication network, satellite network, and the like.

The HTML-based application providing system 300 may provide the application capable of controlling web actions and clients to the clients 100 connected thereto via the network 200. The application may be installed in each of the clients 100 to control web actions and clients.

Specifically, the HTML-based application providing system 300 may provide an application drive file to the clients 100, in which the application drive file hooks event information using an OS component (for example, COM) and executes business logic corresponding to the hooked event information. The application drive file installed in the client 100 may control an HTML region corresponding to a skin on the application, thereby executing is not only a web action but also the business logic with respect to the client 100.

Figure 4:
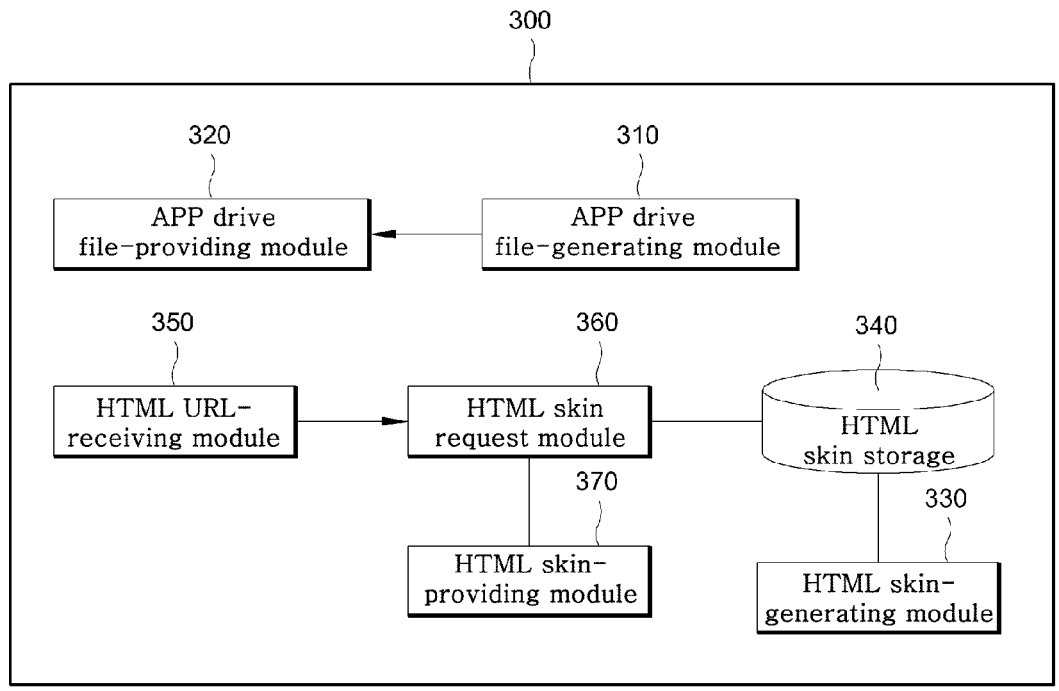
FIG. 4 is a block diagram of the system for providing an HTML-based application capable of controlling web actions and clients in accordance with an exemplary embodiment of the present invention.

FIG. 4 is a block diagram of the system for providing an HTML-based application capable of controlling web actions and clients in accordance with an exemplary embodiment of the present invention.

Referring to FIG. 4, the HTML-based application providing system 300 according to an exemplary embodiment includes an application (APP) drive file-generating module 310, an APP drive file-providing module 320, an HTML skin-generating module 330, an HTML skin storage 340, an HTML URL-receiving module 350, an HTML skin request module 360, and an HTML skin-providing module 370.

The APP drive file-generating module 310 may generate the application drive file that hooks event information generated from the application using an OS component, for example, COM, and executes business logic corresponding to the hooked event information.

The APP drive file-providing module 320 may provide the application drive file generated by the APP drive file-generating module 310 to the clients 100 in response to a request.

The HTML skin-generating module 330 may generate an HTML skin composed of JAVASCRIPT® capable of being called using an OS component (for example, COM). Here, the JAVASCRIPT® can be called by the business logic executed by the application drive file using COM. Thus, results of controlling the client can be displayed on the HTML skin. The HTML skin may include instructions relating to business logic corresponding to control of web actions and clients. Herein, the instruction corresponding to the business logic may be a navigate argument such as, for example, a hyperlink, and may be set as an instruction (e.g., xCommand) to be hooked using COM and to execute control of the client instead of the web actions. As such, is the HTML skin not only may receive a command for executing the business logic of the application from a user, but also may display results of executing the business logic thereon.

The HTML skin storage 340 may store the HTML skin generated by the HTML skin-generating module 330.

The HTML URL-receiving module 350 may receive a URL of the HTML skin from the client 100. That is, the HTML-based application providing system 300 may receive an HTML URL included in the application drive file from the client 100.

The HTML skin request module 360 may search for the HTML skin, which corresponds to the HTML URL from the client 100, in the HTML skin storage 340.

The HTML skin-providing module 370 may provide the HTML skin retrieved from the HTML skin storage 340 to the client 100.

Figure 5A:
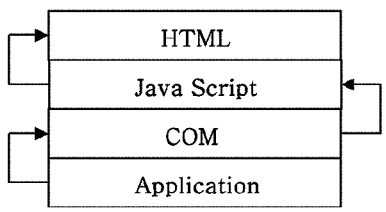
FIG. 5a and FIG. 5b show interoperation between an HTML region and an application region in an HTML-based application capable of controlling web actions and clients in accordance with an exemplary embodiment of the present invention.
Figure 5B:
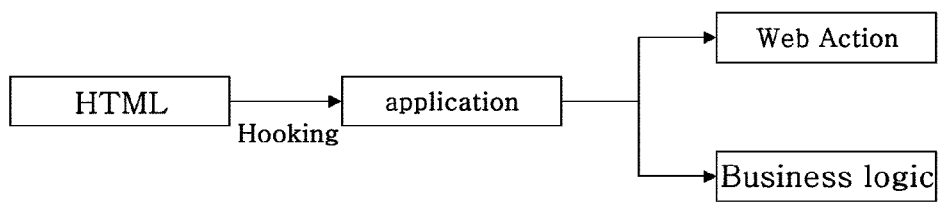

FIG. 5*a* and FIG. 5*b* show interoperation between an HTML region and an application region in an HTML-based application capable of controlling web actions and clients in accordance with an exemplary embodiment of the present invention.

Referring to FIG. 5*b*, if a certain event occurs on an HTML region 420 (shown in FIG. 7), an HTML-based application 400 (shown in FIG. 7) according to an exemplary embodiment may hook the generated event information using an OS component (for example, COM) and may execute business logic if the hooked event information is an instruction (e.g., xCommand) that corresponds to the business logic. Here, if the hooked event information is not an instruction that corresponds to the business logic, the HTML-based application 400 may execute a general web action.

Referring to FIG. 5*a*, if specific business logic is executed on an application region 410 (shown in FIG. 7), the HTML-based application according to an exemplary is embodiment may activate COM to call a JAVASCRIPT® function corresponding to the specific business logic using COM, and may control the HTML region 420 to display a user interface corresponding to the called JAVASCRIPT® function.

As described above, the conventional application cannot execute operations other than HTML loading on the HTML region, but the HTML-based application according to an exemplary embodiment of the present invention enables simultaneous control of web actions and clients through interoperation between the HTML region 420 and the application region 410.

Figure 6:
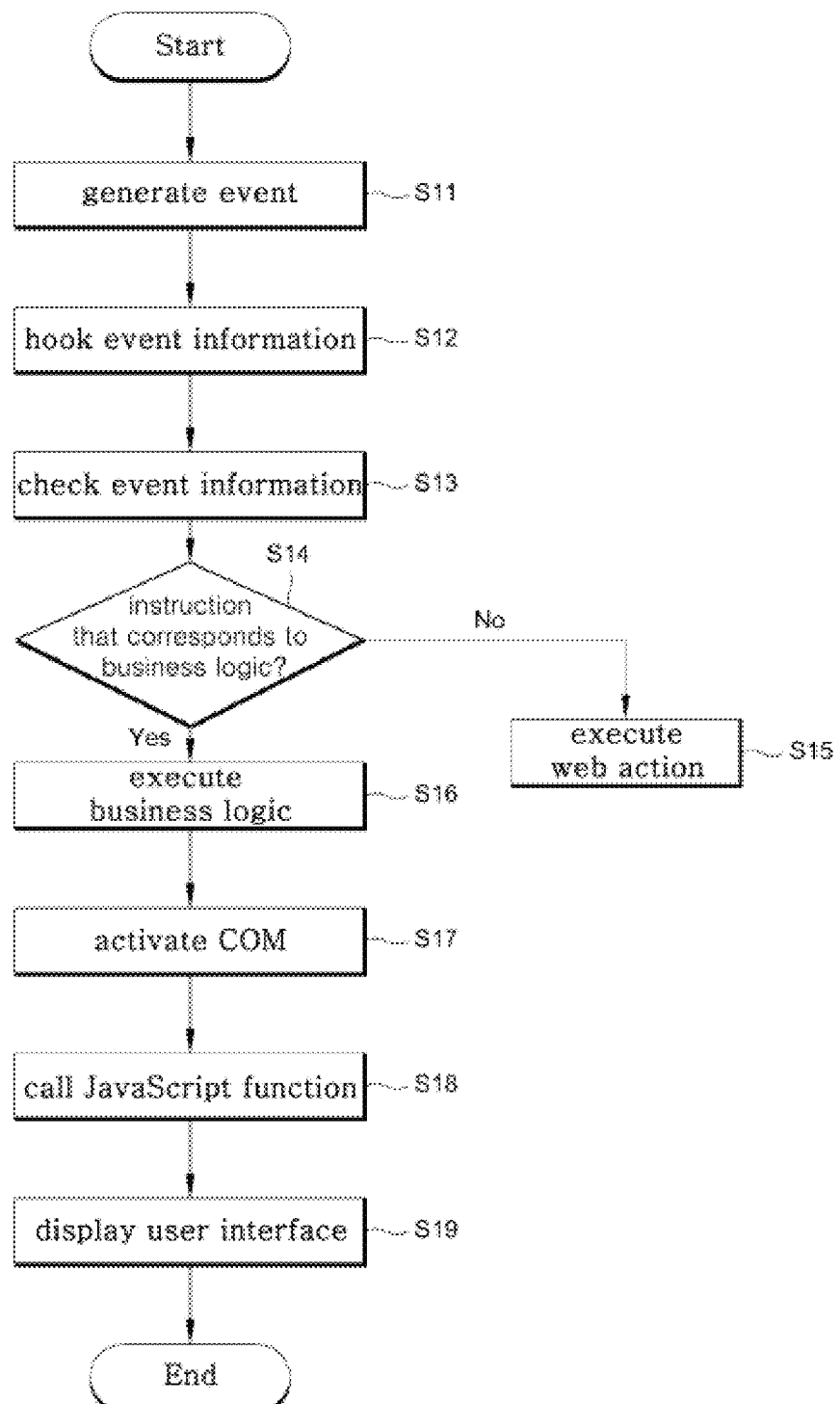
FIG. 6 is a flowchart of a process of interoperating an HTML region with an application region in an HTML-based application capable of controlling web actions and clients in accordance with an exemplary embodiment of the present invention.

FIG. 6 is a flowchart of a process of interoperating the HTML region 420 with the application region 410 in the HTML-based application capable of controlling web actions and clients in accordance with an exemplary embodiment of the present invention.

In operation S11, an event occurs on the HTML region 420. In operation S12, the HTML-based application 400 hooks the generated event information (e.g., a navigate argument) using an OS component (for example, COM).

In operation S13, the application 400 checks the hooked event information and, in operation S14, determines whether the hooked event information is an instruction (e.g., xCommand) that corresponds to business logic.

If it is determined in operation S14 that the hooked event information is not an instruction that corresponds to business logic, but is a hyperlink for executing a general web action, in operation S15 the HTML-based application 400 executes the web action set to the hyperlink. On the other hand, if the hooked event information is an instruction that corresponds to business logic, in operation S16 the HTML-based application 400 executes the business logic corresponding to the instruction. In other words, as shown in FIG. 5*b*, the HTML-based application 400 executes the web action set to the hyperlink if the event information hooked is using COM is the hyperlink for executing the general web action, and executes the business logic corresponding to an instruction if the event information hooked using COM is an instruction corresponding to the business logic.

If specific business logic corresponding to an instruction is executed on the application region 410, the HTML-based application 400, in operation S17, activates an OS component (for example, COM).

In operation S18, the HTML-based application 400 calls a JAVASCRIPT® function using activated COM and, in operation S19, controls the HTML region 420 to display a user interface, such as Ping text, update, installation or the like, corresponding to the called JAVASCRIPT® function. That is, as shown in FIG. 5*a*, when the specific business logic is executed on the application region 410, the HTML-based application 400 activates COM to call the JAVASCRIPT® function corresponding to the specific business logic and controls the HTML region 420 to display the user interface corresponding to the called JAVASCRIPT® function.

As described above, in the conventional application, a user instruction input through the HTML region 420 only influences the HTML region 420, but the HTML-based application 400 according to an exemplary embodiment of the present invention enables simultaneous control of web actions and clients through interoperation between the HTML region and the application region.

Figure 7:
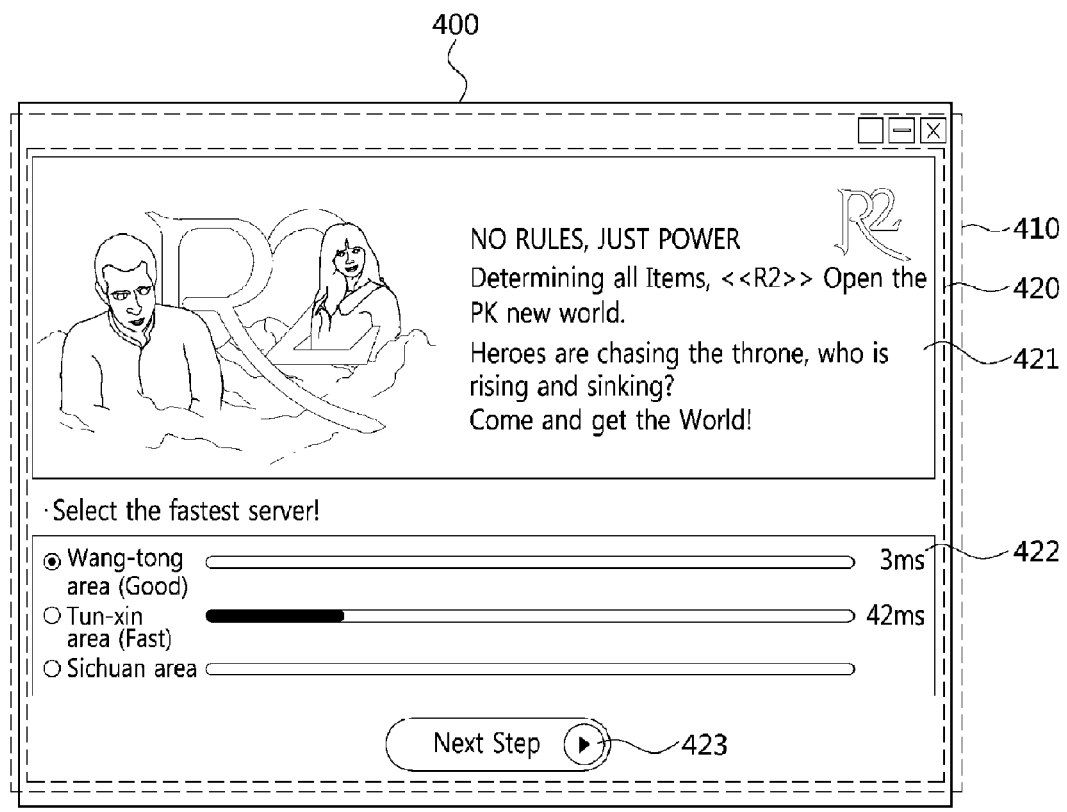
FIG. 7 shows an example of an HTML-based application capable of controlling web actions and clients in accordance with an exemplary embodiment of the present invention.

FIG. 7 shows one example of an HTML-based application capable of controlling web actions and clients in accordance with an exemplary embodiment of the present invention.

Referring to FIG. 7, an HTML-based application 400 according to an exemplary is embodiment includes an application region 410 and an HTML region 420.

The application region 410 is displayed in a region on a screen of a client 100 when an application drive file is driven. The application region 410 includes a system area and a boundary area.

The HTML region 420 displays an HTML skin that interoperates with the application region 410 and is transmitted from the HTML-based application providing system 300 through a network 200 when the application drive file is driven. Here, the HTML region 420 may receive the HTML skin transmitted from the HTML-based application providing system 300 by transmitting an HTML URL in the application drive file, which may have been previously provided from the HTML-based application providing system 300 and installed in the client 100, to the HTML-based application providing system 300. Further, the HTML skin may be composed of JAVASCRIPT® capable of being called using an OS component (for example, COM) and may include user interfaces, for example, an advertisement section 421, an update section 422, and a game start button 423. The user interfaces may also be composed of JAVASCRIPT® capable of being called using an OS component (for example, COM).

According to an exemplary embodiment, the user interfaces may be displayed on the HTML region 420 interoperating with the application region 410 and may be different from a user interface on an application region that operates independent of a conventional HTML region.

Figure 8:
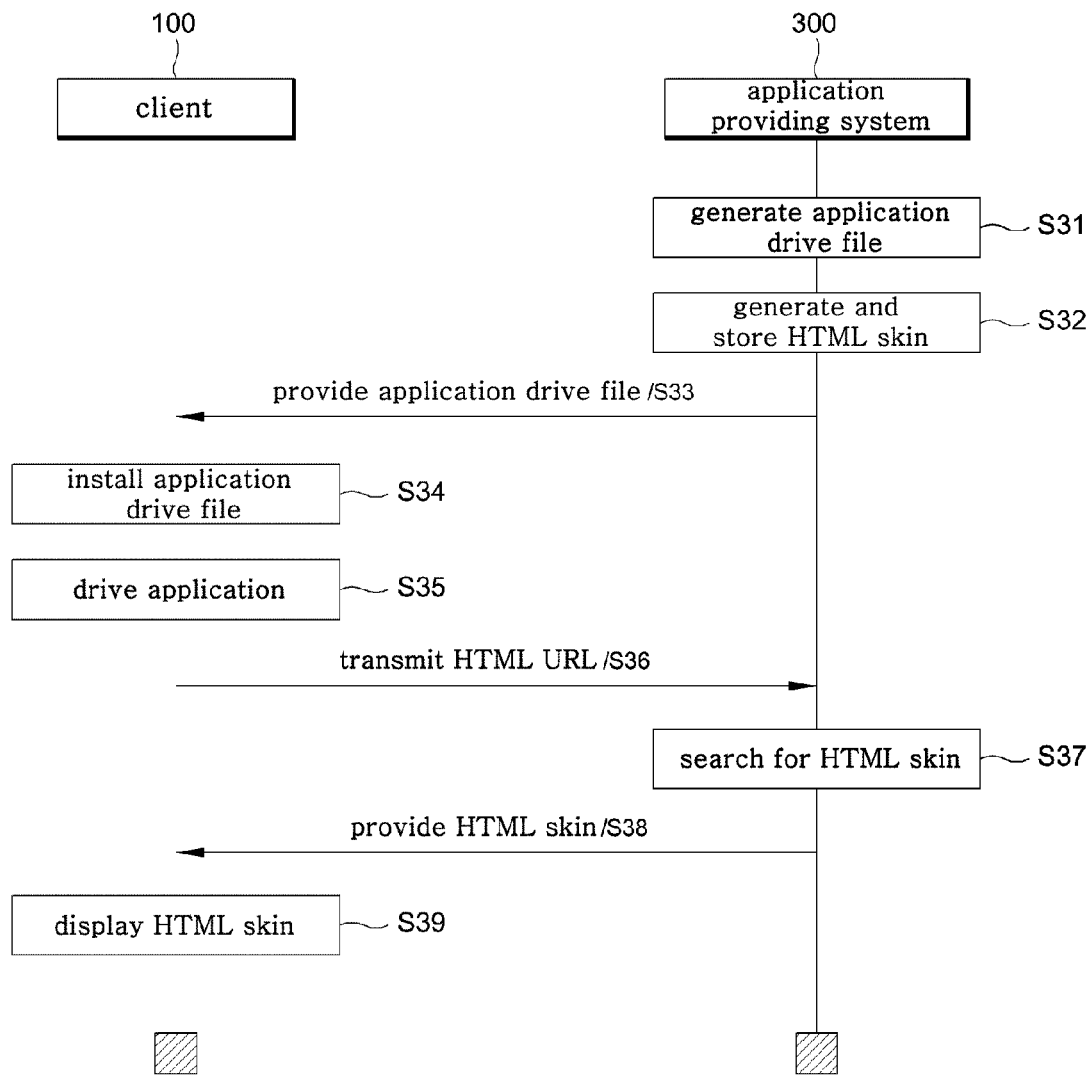
FIG. 8 is a flow diagram of a method of providing an HTML-based application capable of controlling web actions and clients in accordance with an exemplary embodiment of the present invention.

FIG. 8 is a flow diagram of a method of providing an HTML-based application capable of controlling web actions and clients in accordance with an exemplary embodiment of the present invention.

In operation S31, the HTML-based application providing system 300 generates an is application drive file configured to be installed in clients 100, and hook event information generated from an application to execute business logic.

In operation S32, the HTML-based application providing system 300 generates and stores an HTML skin configured to interoperate with the application installed in the clients 100. Here, the HTML skin includes an instruction (e.g., xCommand) corresponding to business logic or a web action, according to the event information generated from the application. Further, the HTML skin includes a JAVASCRIPT® function that allows the executed business logic to be called by an OS component (for example, COM) and to be displayed as execution results on the HTML skin. Further, the HTML skin includes a variety of user interfaces that receive user commands for executing the business logic of the application or for displaying results of executing the business logic.

In operation S33, the HTML-based application providing system 300 provides the application drive file to a client 100 in response to a request.

In operation S34, the client 100 installs the application drive file provided from the HTML-based application providing system 300 and, in operation S35, drives the application.

In response to driving of the application, in operation S36 the client 100 may transmit a URL of an HTML skin, thereby requesting the HTML-based application providing system 300 to transmit an HTML skin that will be displayed in the HTML region 420 on the HTML-based application 400. Here, the application drive file includes a URL of the HTML skin displayed in the HTML region 420 on the application.

In operation S37, the HTML-based application providing system 300 searches for the HTML skin, which corresponds to the HTML URL received from the client 100, in the HTML skin storage 340 and, in operation S38, provides the retrieved HTML skin to the client.

In operation S39, the client 100 displays the HTML skin, which is provided from the HTML-based application providing system 300, in the HTML region 420 of the application.

According to an exemplary embodiment of the present invention, the HTML-based application may control web actions and clients at the same time through interoperation between the HTML region and the application region.

According to an exemplary embodiment of the present disclosure, user interfaces (UIs) of the application may be easily modified merely by modifying HTML used as a skin file without modification of the application.

Exemplary embodiments of the present invention may be realized in the form of a computer-readable medium including program instructions such as program modules that can be executed by various computer components. The computer-readable medium includes all types of available media that can be accessed by the computer and include volatile and non-volatile media, and removable and non-removable media. Further, the computer readable medium may include computer storage media and communication media. Examples of computer storage media include volatile and non-volatile media, and removable and non-removable media which are realized in any method or technique for storage of information such as computer readable instructions, data structures, program modules, or other data. Examples of a communication medium typically include computer readable instructions, data structures, program modules, other data of modulated data signals such as carrier waves, or other transmission mechanisms, or any data transmission media.

Although exemplary embodiments have been described above, components or entire operations thereof may be realized by any computer system including general hardware architectures.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of providing a HyperText Markup Language (HTML)-based application, the method comprising:
   generating an application drive file, wherein
     the application drive file is configured to hook information generated by the HTML-based application,
     the application drive file is configured to execute business logic corresponding to the hooked information using an operating system component, the business logic being an argument set as an instruction to be hooked and executing control of a client instead of a web action, the web action being an action across the web from one site or application to another site or application and wherein
     the HTML-based application comprises an HTML region and an application region, wherein
       the operating system component is activated in response to execution of the business logic in the application region, and
     wherein the business logic is executed when the hooked information is determined as an instruction corresponding to the business logic, and the web action is executed when the hooked information is determined as an instruction not corresponding to the business logic;
   generating and storing an HTML skin configured to interoperate with the application drive file;
   providing the HTML skin to a client, the HTML skin comprising instructions corresponding to the business logic; and
   displaying the HTML skin in the HTML region, wherein the web actions and clients are controlled using the HTML skin by an interoperation between the HTML region and the application region, wherein the web action and the client are simultaneously controlled,
   wherein the HTML skin is displayed over an HTML region and an application region of the application drive file, and
   wherein the application drive file-generating module provides an HTML URL to the application drive file, and the HTML skin is provided from the HTML URL when the application drive file is launched.

2. The method of claim 1, wherein the application drive file is configured to hook the information by using the operating system component.

3. The method of claim 2, wherein the HTML skin comprises a prototype-based scripting language comprising capable of being called by the application drive file using the operating system component.

4. The method of claim 1, wherein the business logic comprises a navigate argument.

5. The method of claim 4, wherein the navigate argument is set as an instruction to execute control of the clients.

6. The method of claim 1, further comprising:
providing the generated application drive file to the clients.

7. The method of claim 6, further comprising:
receiving the uniform resource locator (URL) corresponding to the HTML skin from the clients; and
searching for the HTML skin in an HTML skin storage.

8. A method of interoperating a HyperText Markup Language (HTML) region with an application region in an HTML-based application, the method comprising:
hooking information generated in the HTML region, wherein
the HTML-based application comprises a HTML region and an application region, wherein
web logic performed in the HTML region corresponds to a web action, the web action being an action across the web from one site or application to another site or application, and
business logic performed in the application region activates an operating system component that controls the HTML region, the business logic being an argument set as an instruction to be hooked and executing control of a client instead of the web action;
determining whether the information is an instruction corresponding to a web action or to business logic;
executing, in the application region, the business logic corresponding to the instruction, in response to a determination that the hooked information is an instruction corresponding to business logic;
executing, in the application region, web actions corresponding to the instruction, in response to a determination that the hooked information is not an instruction corresponding to business logic; and
displaying, in the HTML region, a result of the execution of the business logic, wherein the web actions and the HTML-based application of a client terminal are simultaneously controlled by an interoperation between the HTML region and the application region,
wherein the web action and the client are simultaneously controlled,
wherein an HTML skin is displayed over an HTML region and an application region of the application drive file, and
wherein the application drive file-generating module provides an HTML URL to the application drive file, and the HTML skin is provided from the HTML URL when the application drive file is launched.

9. The method of claim 8, wherein the information is hooked by an operating system component comprising a component object model (COM).

10. The method of claim 8, further comprising:
calling a function of a prototype-based scripting language corresponding to the business logic using the operating system component.

11. A system for providing a HyperText Markup Language (HTML)-based application, the system comprising:
a non-transitory storage device; and
one or more modules, executable by a processor, the modules comprising:
a skin-generating module configured to generate an HTML skin and store the generated HTML skin in the storage device, wherein
the HTML skin comprises instructions directed to a web action and instructions directed to a business logic, the web action being an action across the web from one site or application to another site or application and the business logic being an argument set as an instruction to be hooked and executes control of a client instead of web actions wherein
the HTML skin is displayed in an area comprising:
an HTML region where web logic is configured to control web actions, and
an application region where the business logic is configured to activate a first operating system component configured to control the HTML region; and
an application drive file-generating module configured to generate an application drive file, wherein
the application drive file is configured to use a second operating system component to hook information generated by the HTML region and the application region, wherein
the second operating system component is configured to execute the business logic when the hooked information is an instruction corresponding to the business logic, and
the second operating system component is configured to execute the web action when the hooked information is not an instruction corresponding to the business logic, and wherein
the HTML region and the application region are configured to be simultaneously controlled by an interoperation between the HTML region and the application region,
wherein the system simultaneously controls the web action and client, and
wherein the HTML skin is displayed over the HTML region and the application region of the application drive file,
wherein the application drive file-generating module provides an HTML URL to the application drive file, and the HTML skin is provided from the HTML URL when the application drive file is launched.

12. The system of claim 11, wherein the information is hooked by the second operating system component comprising a component object model (COM).

13. The system of claim 12, wherein the script comprises a prototype-based scripting language capable of being called by the application drive file using the second operating system component.

14. The system of claim 11, wherein the business logic comprises a navigate argument.

15. The system of claim 14, wherein the navigate argument is set as an instruction to execute control of the clients.

16. The system of claim 11, wherein the application drive file comprises a uniform resource locator (URL) corresponding to the HTML skin.

17. The system of claim 11, further comprising:
an application drive file-providing module to provide the generated application drive file to the clients.

18. The system of claim 17, further comprising:
- a uniform resource locator (URL)-receiving module to receive an HTML URL corresponding to the HTML skin from a client;
- a skin request module to search for the HTML skin in the storage device; and
- a skin-providing module to provide the HTML skin to the client.

19. The system of claim 1, wherein a product of an execution of the business logic is displayed in the HTML skin.

* * * * *